(12) United States Patent
Liu et al.

(10) Patent No.: US 7,956,806 B2
(45) Date of Patent: Jun. 7, 2011

(54) TRACKING ARRANGEMENT FOR A COMMUNICATIONS SYSTEM ON A MOBILE PLATFORM

(75) Inventors: Zhang Liu, Rowland Heights, CA (US); Gregory A. Shreve, San Pedro, CA (US)

(73) Assignee: Northrop Grumman Space and Mission Systems Corp., Los Angeles, CA (US)

( * ) Notice: Subject to any disclaimer, the term of this patent is extended or adjusted under 35 U.S.C. 154(b) by 169 days.

(21) Appl. No.: 12/484,604

(22) Filed: Jun. 15, 2009

(65) Prior Publication Data

US 2010/0315288 A1   Dec. 16, 2010

(51) Int. Cl.
*H01Q 3/00*  (2006.01)
(52) U.S. Cl. ........................................... 342/359
(58) Field of Classification Search .................. 342/359
See application file for complete search history.

(56) References Cited

U.S. PATENT DOCUMENTS

| | | | |
|---|---|---|---|
| 6,832,070 B1 * | 12/2004 | Perry et al. | 455/3.02 |
| 2004/0135735 A1 * | 7/2004 | Naym et al. | 343/882 |
| 2006/0212909 A1 * | 9/2006 | Girard et al. | 725/73 |
| 2009/0096671 A1 * | 4/2009 | Mizuochi | 342/357.12 |

* cited by examiner

*Primary Examiner* — Thomas H Tarcza
*Assistant Examiner* — Harry Liu
(74) *Attorney, Agent, or Firm* — Tarolli, Sundheim, Covell & Tummino LLP

(57) ABSTRACT

Systems and methods are provided for orienting an antenna in a communications system on a mobile platform to orient a peak of the antenna pattern in a direction associated with a signal source. A signal from a signal source is received at the antenna. A signal strength is measured from the received signal. A signal strength and a misalignment of the antenna along at least one axis are predicted according to a previous estimate of the signal strength, a previous estimate of the misalignment of the antenna, an estimated change in the signal strength, and a known change in the antenna orientation. The predicted signal strength and misalignment of the antenna are updated according to the measured signal strength to provide an estimate of a current misalignment of the antenna. The orientation of the peak of the antenna pattern is adjusted according to the estimated current misalignment of the antenna.

20 Claims, 3 Drawing Sheets

TRACKING ARRANGEMENT FOR A COMMUNICATIONS SYSTEM ON A MOBILE PLATFORM

TECHNICAL FIELD

The present invention relates to communications systems and, more particularly, to systems and methods for tracking a signal source in a communications system on a mobile platform.

BACKGROUND OF THE INVENTION

In any communications system, it is important to maintain high quality connections between elements of the communications. Mobile communication systems, for example, communications systems implemented on ground vehicles, aircraft, spacecraft, and watercraft, introduce unique challenges in maintaining signal quality. One example of a mobile communications system is Satcom On The Move (SOTM), or satellite communications on the move. The basic principle behind satellite communications on the move is that a vehicle equipped with a satellite antenna is able to establish communication with a satellite and maintain that communication while the vehicle is moving.

SUMMARY OF THE INVENTION

In accordance with one aspect of the present invention, a method is provided for orienting an antenna in a communications system on a mobile platform to orient a peak of the antenna pattern in a direction associated with a signal source. A signal from a signal source is received at the antenna. A signal strength is measured from the received signal. A signal strength and a misalignment of the antenna along at least one axis are predicted according to a previous estimate of the signal strength, a previous estimate of the misalignment of the antenna, an estimated change in the signal strength, and a known change in the antenna orientation. The predicted signal strength and misalignment of the antenna are updated according to the measured signal strength to provide an estimate of a current misalignment of the antenna. The orientation of the peak of the antenna pattern is adjusted according to the estimated current misalignment of the antenna.

In accordance with another aspect of the present invention, a communications system is configured to allow communications between a mobile platform and a signal source. An antenna assembly includes an antenna. A modem is configured to determine a signal strength of a signal received at the antenna. An attitude control assembly is configured to estimate a misalignment of the antenna from at least the determined signal strength, an orientation of the antenna at a previous time, an estimated signal strength at the previous time, and an estimated change in the signal strength. The attitude control assembly utilizes a Kalman filter. An orientation system is configured to alter the orientation of the antenna according to the estimated current orientation at the Kalman filter.

In accordance with yet another aspect of the present invention, a computer readable medium stores executable instructions configured to determine a misalignment of a peak response of an antenna from a signal source. The executable instructions include a modem interface configured to measure a signal strength from a signal received at the antenna. A Kalman filter is configured to predict a signal strength and a misalignment of the antenna along at least one axis as a state of the Kalman filter and update each of the predicted signal strength and misalignment of the antenna according to the measured signal strength to provide an estimate of a current misalignment of the antenna. An attitude control element is configured to provide instructions to an antenna assembly as to adjust the orientation of the peak of the antenna pattern according to the estimated current misalignment of the antenna.

DETAILED DESCRIPTION OF INVENTION

The invention described herein relates to communications systems, and particularly to communication systems for communicating with a signal source, such as a satellite or an aircraft, from a mobile platform. It will be appreciated that a mobile platform, as used herein, can include any manned or unmanned ground vehicle, aircraft, watercraft, or spacecraft. In a mobile communications system, when initially aligning the antenna to the signal source, the antenna is first pointed in the general direction of the source. For example, where the signal source is a satellite, the directional coordinates (e.g., azimuth and elevation) of the antenna necessary for the antenna to point at the desired satellite can be known or determined from satellite ephemeris data, and used to initially align the antenna pattern with the satellite. Once the antenna is positioned to the directional coordinates of the signal source, the antenna is quickly scanned in the azimuth and elevation directions until the antenna is pointed with sufficient accuracy as to begin receiving a signal from the signal source. It will be appreciated, however, that the alignment of the antenna will not initially be optimal, limiting the bandwidth available through the antenna. Further, minor jostling of the antenna can lead to misalignment and the accompanying drop in signal quality. In accordance with an aspect of the present invention, an attitude control system is provided for maintaining a desired alignment of an antenna with a signal source.

Figure 1:
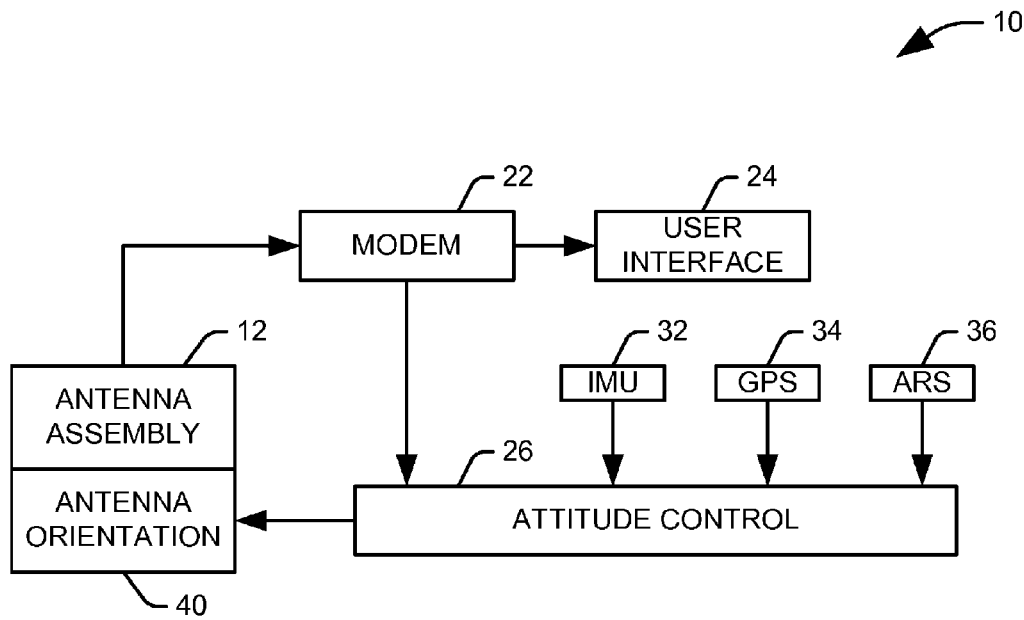
FIG. 1 illustrates a mobile communications system in accordance with an aspect of the present invention.

FIG. 1 illustrates a mobile communications system 10 in accordance with an aspect of the present invention. The illustrated system 10 is configured to maintain an antenna assembly 12 pointed at a signal source, such as a satellite relay or aircraft, as to maintain a desired received signal strength at the antenna assembly. For example, the antenna assembly 12 can include a dish that is utilized to both reflect and focus electromagnetic signals received from the signal source into an opening of a feed horn. It is will be appreciated that while the examples disclosed herein describe aligning the antenna with a satellite, the antenna pointing device and method of the present invention can be utilized with essentially any antenna pointing application in which a signal is received and an appropriate signal strength can be measured.

Any of several approaches can be utilized for obtaining the returned signal strength such as dithering a sub-reflector or utilizing a four patches arrangement. In one implementation, the antenna assembly 12 includes motors that steer the antenna toward the target at least along azimuth and elevation angles. The motors have accurate encoders (resolvers) for position feedback. Therefore, the motors can create a very small mis-pointing offset if the antenna is stationary, and the relative movement is known through motor position feedback. In the case that the antenna is on-the-move (OTM), a natural misalignment occurs due to the OTM dynamics and the dynamics is captured by the inertial measurement, such that the antenna's current pointing angle is known relative to its previous pointing angle.

The signals obtained at the antenna assembly 12 are provided to a modem 22, which processes the received signals to provide a digital representation of the received signals. The digital representation can be passed to a user interface 24 where it can be converted to an appropriate form for presentation to a user. For example, the user interface 24 can comprise one or more of a display and a speaker. The modem 22, which can include a modem for demodulating data from the signal source, is further configured to produce an indication of the received signal strength (RSS) to an attitude control assembly 26. For example, the indication can include a digital signal representing a value proportional to the power or signal quality received at the antenna assembly 12.

The mobile communications system 10 further includes an inertial measurement unit (IMU) 32 that measures a movement of the antenna assembly 12 and provides the measured movement data to the attitude control assembly 26. A global positioning system 34 can estimate an absolute position of the mobile communications system 10 and provide the estimated position to the attitude control assembly 12. It will be appreciated that the global positioning system 34 can further be utilized to provide an estimate of the current time to the attitude control assembly 26. Alternatively, an appropriate timing mechanism (not shown) can be utilized to provide this data. An attitude reference sensor 36 can be used to provide azimuth and elevation data for the antenna assembly 12. It will be appreciated that the attitude reference sensor 36 and the inertial measurement unit can be part of a single integral assembly.

In accordance with an aspect of the present invention, the attitude control assembly 26 can be configured to estimate the current orientation and position of the antenna at any given time from at least the received signal strength. To this end, the attitude control assembly 26 includes a Kalman filter that maintains a running estimate of the position and orientation of the antenna, as well as an estimate of an expected received signal strength. The estimated orientation and signal strength are updated according to new measurements of the signal strength to maintain an accurate estimate of the orientation of the antenna. From the estimated position and orientation and a known position of the signal source, for example, from satellite ephemeris data, a necessary adjustment to the orientation of the antenna pattern to maintain a desired signal strength can be determined. One advantage of the Kalman filter estimation is that an inertial measurement unit of lower quality and expense can be utilized, with the Kalman filter accounting for the measurement error expected from the lower cost inertial measurement unit.

In the illustrated implementation, the antenna assembly 10 includes an orientation element 40 configured to adjust the orientation of the peak of the antenna pattern in response to instructions from the attitude control assembly. For example, the antenna assembly can comprise a motorized antenna platform that can be actuated to physically reposition the azimuth and elevation of the antenna as to direct the antenna response peak at the signal source. Alternatively, the orientation element 40 can include a control system for an antenna array, and the antenna pattern can be altered electronically by altering the power provided to one or more active antenna elements in response to the output of the attitude control assembly 26. By tracking the received signal strength along with the other available variables, the attitude control system 26 can maintain the antenna pattern at a desired alignment with the signal source.

Figure 2:
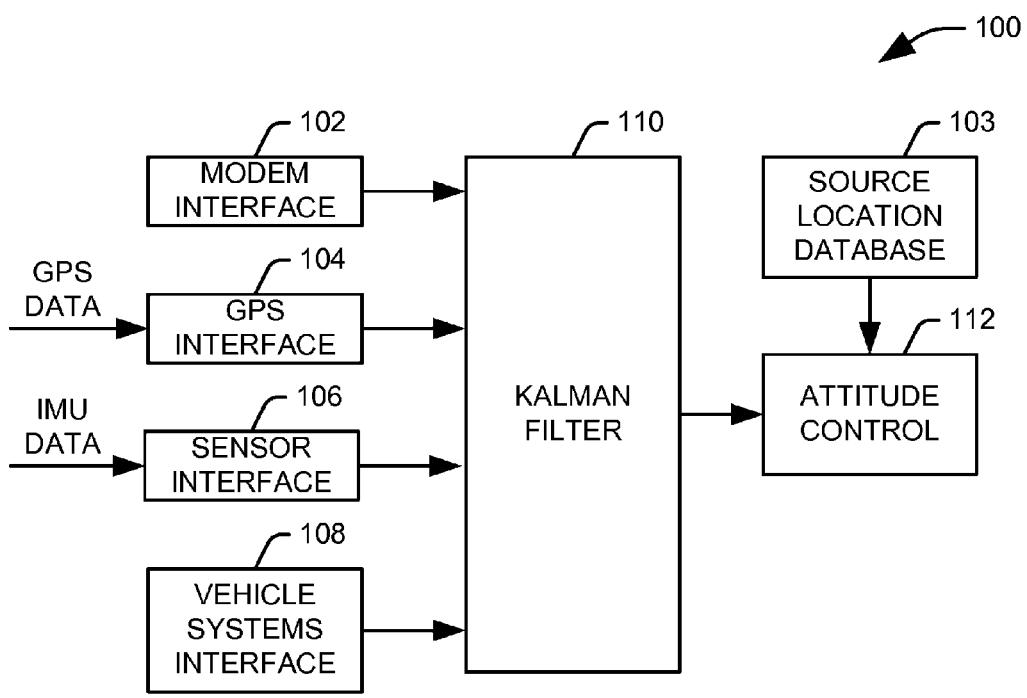
FIG. 2 illustrates an attitude control system for maintaining an alignment of an antenna with a signal source, such as a satellite relay or an aircraft, for a mobile communications system in accordance with an aspect of the present invention.

FIG. 2 illustrates an attitude control system 100 for maintaining an alignment of an antenna with a signal source, such as a satellite relay or an aircraft, for a mobile communications system in accordance with an aspect of the present invention. The attitude control system 100 includes a modem interface 102 that receives a signal indicative of the received signal strength at the antenna and converts the received signal into a digital value. A database 103 stores data concerning the location of the signal source. For example, the database 103 can include flight path information for an aircraft or ephemeris data for a satellite. A global positioning system (GPS) interface 104 processes data from the GPS system to provide an estimated position of the mobile communications system. A sensor interface 106 receives data from each of an attitude reference system (ARS) and an inertial measurement unit (IMU), and determines a position and orientation of the antenna in an antenna reference frame. A vehicle systems interface 108 receives at least one signal from vehicle systems, such as the speed and altitude of the vehicle. The data from each interface 102, 106, and 108, along with the GPS data, can be provided to a Kalman filter 110 to estimate a misalignment of the antenna.

In accordance with an aspect of the present invention, the Kalman filter 110 can be implemented to utilize at least the signal strength data received from the modem interface 102 to estimate the misalignment of the antenna. For the purpose of illustration, the foregoing discussion focuses on the implementation of a Kalman filter 110 utilizing only the received signal strength to estimate a misalignment of the antenna. It will be appreciated, however, that the Kalman filter 110 can be configured to also utilize one or more of position and orientation data from the sensor interface 106, received GPS data, and data from the vehicle systems interface 108. For the purpose of the foregoing analysis, a first axis of an antenna coordinate system can be conceptualized as an ideal alignment of the antenna to the signal source, and the misalignment of the antenna can be quantified as a deviation, δy along a second axis, and a second deviation, δz, along a third axis. In the following discussion, the displacement is represented as a vector, $x(k)=[\delta y, \delta z]^T$.

It will be appreciated that the predicted change for a given iteration can be determined, for example, as the correction applied to the antenna alignment in the previous iteration. Respective expected changes, $u(k)=[u_y(k), u_z(k)]^T$, in the misalignment values along each of the second and third axes over one iteration of the Kalman filter can be defined, such that:

$$\delta y(k+1) = \delta y(k) + u_y(k) \qquad \text{Eq. 1}$$

$$\delta z(k+1) = \delta z(k) + u_z(k) \qquad \text{Eq. 2}$$

where k is a time index of the Kalman index.

The returned signal strength at the antenna at a given time, y(k), is a function of the misalignment of the antenna, such that:

$$y(k) = ax^T(k)x(k) + c \qquad \text{Eq. 3}$$

where c is a maximum signal strength and a is a constant parameter.

Since the signal strength varies as a square of the deviation of the antenna from the ideal alignment, it cannot be represented directly in a linear instantiation of the Kalman filter 110. In accordance with an aspect of the present invention, the Kalman filter 110 can be configured to estimate a change in the signal strength between iterations, given the current misalignment and the expected change. Essentially, an additional memory state is incorporated into the state space equations to linearize the estimation of the signal strength. By incorporating the signal strength as part of the predicted Kalman state, the signal strength measurement can be predicted as a change in the signal strength, which varies linearly with the antenna misalignment. Specifically, the Kalman filter models an expected difference between a first state y(k) and a second state y(k+1) as a linear function of, such that:

$$y(k+1) - y(k) = ax^T(k+1)x(k+1) + c - ax^T(k)x(k) - c + m(k+1) - m(k)$$
$$= a(x(k)+u(k))^T(x(k)-u(k)) - ax^T(k)x(k) + m(k+1) - m(k)$$
$$= 2au(k)^T x(k) + au(k)^T u(k) + m(k+1) - m(k) + f(n(k))$$

Eq. 4 where n(k) and m(k) are process noise and measurement noise respectively.

To this end, the state, x(k), of the Kalman filter can be augmented to include a running estimate of the signal strength, such that $x(k)=[\delta y, \delta z, y(k)]^T$. Using the augmented state and the linearized representation of the expected difference between y(k+1) and y(k) from Eq. 4, the state space equation for predicting the misalignment between iterations can be implemented as:

$$x(k+1)^- = \begin{bmatrix} 1 & 0 & 0 \\ 0 & 1 & 0 \\ 2au_x(k) & 2au_y(k) & 1 \end{bmatrix} x(k) + \begin{bmatrix} u_x \\ u_y \\ a(u_x^2+u_y^2) \end{bmatrix} + \begin{bmatrix} n_1(k) \\ n_2(k) \\ m(k+1)-m(k)+f(n(k)) \end{bmatrix}$$

Eq. 5

Since the signal strength is updated within the augmented state of the Kalman filter 110, the estimated signal strength can be determined as:

$$y(k)=[0\ 0\ 1]x(k)+m(k)$$

Eq. 6

For any given estimated state of the filter, the Kalman filter 110 can provide the predicted state, $x(k+1)^-$, as shown in Eq. 5 above, along with an error covariance matrix, P(k), which represents an accuracy of the state estimate. The Kalman filter 110 can then update the determined estimate to account for the measured received signal strength. Essentially, this process involves a weighting of the previous estimate and calculating an optimal Kalman gain, K(k), for the filter. From the error covariance matrix, P(k), a predicted estimate covariance, $P(k)^-$, can be determined as:

$$P(k)^-=A(k)P(k)A(k)^T+Q(k)$$

Eq. 7 where Q(k) is the process noise covariance and $$A(k) = \begin{bmatrix} 1 & 0 & 0 \\ 0 & 1 & 0 \\ 2au_x(k) & 2au_y(k) & 1 \end{bmatrix}$$

From the predicted estimate covariance, the Kalman gain for the update, K(k), can be determined as:

$$K(k)=P(k)^-H(k)^T[H(k)P(k)^-H(k)^T+R(k)]$$

Eq. 8 where R(k) is the measurement noise covariance and H(k)=[0, 0, 1]

From the Kalman gain, an updated estimate of the antenna deflection and the signal strength can be determined as:

$$x(k+1)=x(k+1)^-+K(k)[y_m(k)-H(k)x(k+1)^-]$$

Eq. 9 where $y_m(k)$ is the signal strength measurement.

A new error covariance matrix, P(k+1), can be calculated as:

$$P(k+1)=[I-K(k)H(k)]P(k)^-[I-K(k)H(k)]^T+K(k)R(k)K(k)^T$$

Eq. 10

The estimate of the antenna misalignment determined at the Kalman filter 110 can be provided to an attitude control element 112. The attitude control element 112 is configured to correct the estimated misalignment of the antenna as to maintain the connection with the signal at a desired signal strength. It will be appreciated that the attitude control element 112 can further be configured to handle coarse alignment of the antenna, utilizing data from the GPS system 104 and the database 103 to locate and establish a connection with the signal source.

Figure 3:
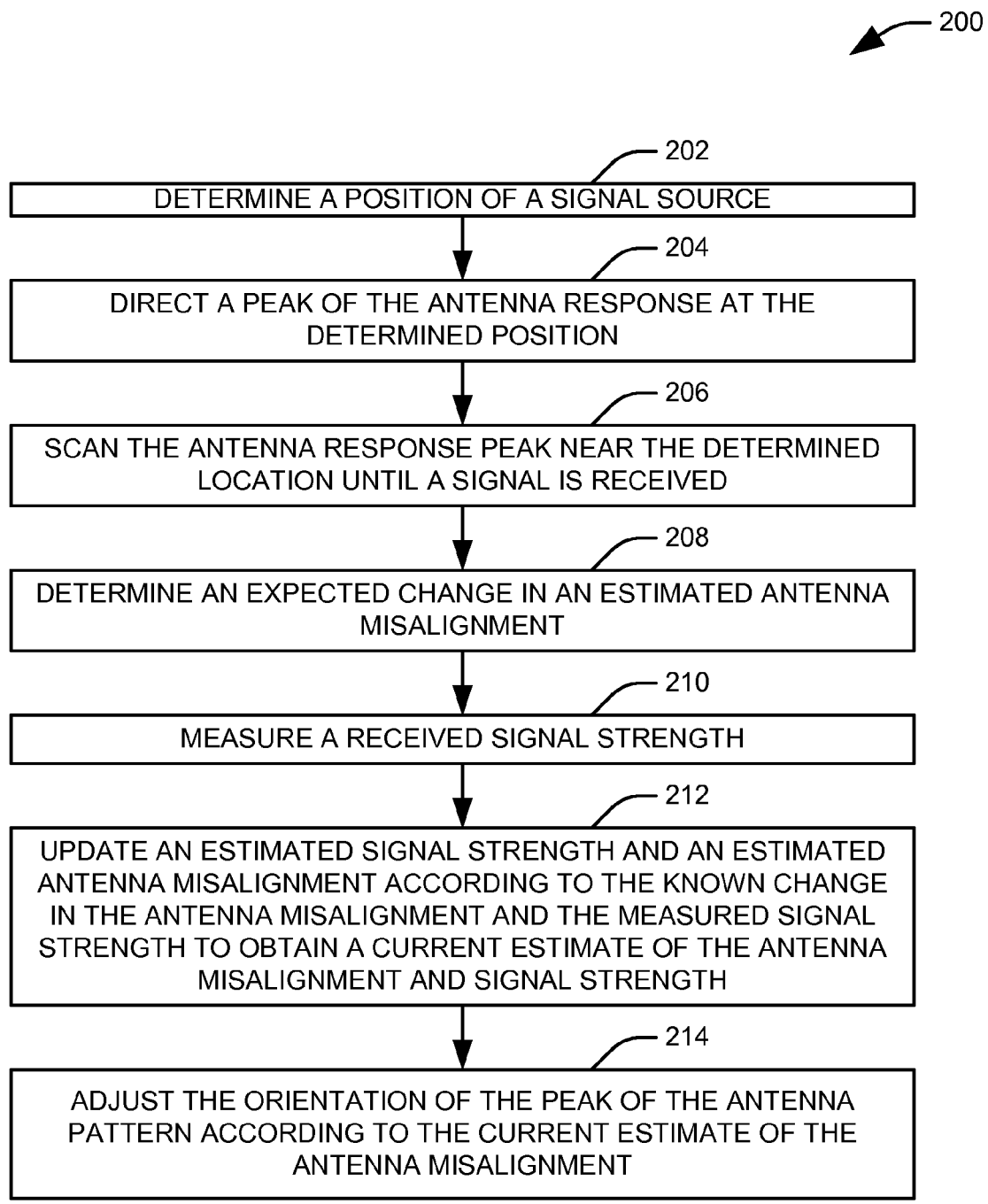
FIG. 3 illustrates a methodology for orienting an antenna in a communications system on a mobile platform as to maintain a peak of the antenna response pattern in alignment with a signal source.

In view of the foregoing structural and functional features described above, a methodology in accordance with various aspects of the present invention will be better appreciated with reference to FIG. 3. While, for purposes of simplicity of explanation, the methodology of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention FIG. 3 illustrates a methodology 200 for orienting an antenna in a communications system on a mobile platform as to maintain a peak of the antenna response pattern in alignment with a signal source. The methodology 200 begins at 202 where a position of a signal source is determined. For example, where the signal source is an aircraft, the position can be determined from a known time (e.g., from a global positioning system associated with the mobile platform) and a predetermined flight path of an aircraft. Where the signal source is a satellite, the location can be determined from the time and ephemeris data for the satellite. At 204, the peak of the antenna pattern is directed toward the determined position, and at 206, the antenna pattern peak is scanned across the determined location at least one axis until a signal is received.

At 208, as part of a Kalman filtering process, a change in an estimated antenna misalignment can be determined. For example, the change in the estimated antenna misalignment can be determined from a known adjustment to the antenna position or orientation since the estimate and sensor data from one or more sensors that detect movement or rotation of the antenna platform. At 210, a signal strength is determined from the received signal. For example, the signal received at the antenna can be evaluated to determine a maximum power received at the antenna over a given interval. At 212, a previous estimated antenna misalignment and estimated signal strength in the Kalman filter is updated according to at least the measured signal strength and the known change in the antenna misalignment. In accordance with an aspect of the present invention, a change in the signal strength can be related linearly to the antenna misalignment. Accordingly, a Kalman filter state, including the antenna misalignment along two axes and a predicted signal strength, can be updated according to the measured signal strength to provide an updated estimate of the misalignment along each axis and the signal strength. It will be appreciated that the Kalman filter can further utilize data from one or more of an inertial measurement unit and an attitude reference sensor associated with the antenna platform, data from one or more systems of the mobile platform, and global positioning system data to estimate the antenna misalignment.

At 214, the orientation of the peak of the antenna pattern can be adjusted according to the estimated orientation from the Kalman filter. For example, a dish antenna can be rotated or otherwise mechanically altered in orientation of the antenna in response to the estimate from the Kalman filter. Alternatively, for an antenna array, a power provided to at least one active element of the antenna can be changed to alter to orientation of the antenna response peak. It will be appreciated that the Kalman filter can update the antenna misalignment with each new signal strength measurement, to provide a continuous tracking of the signal source at the antenna.

Figure 4:
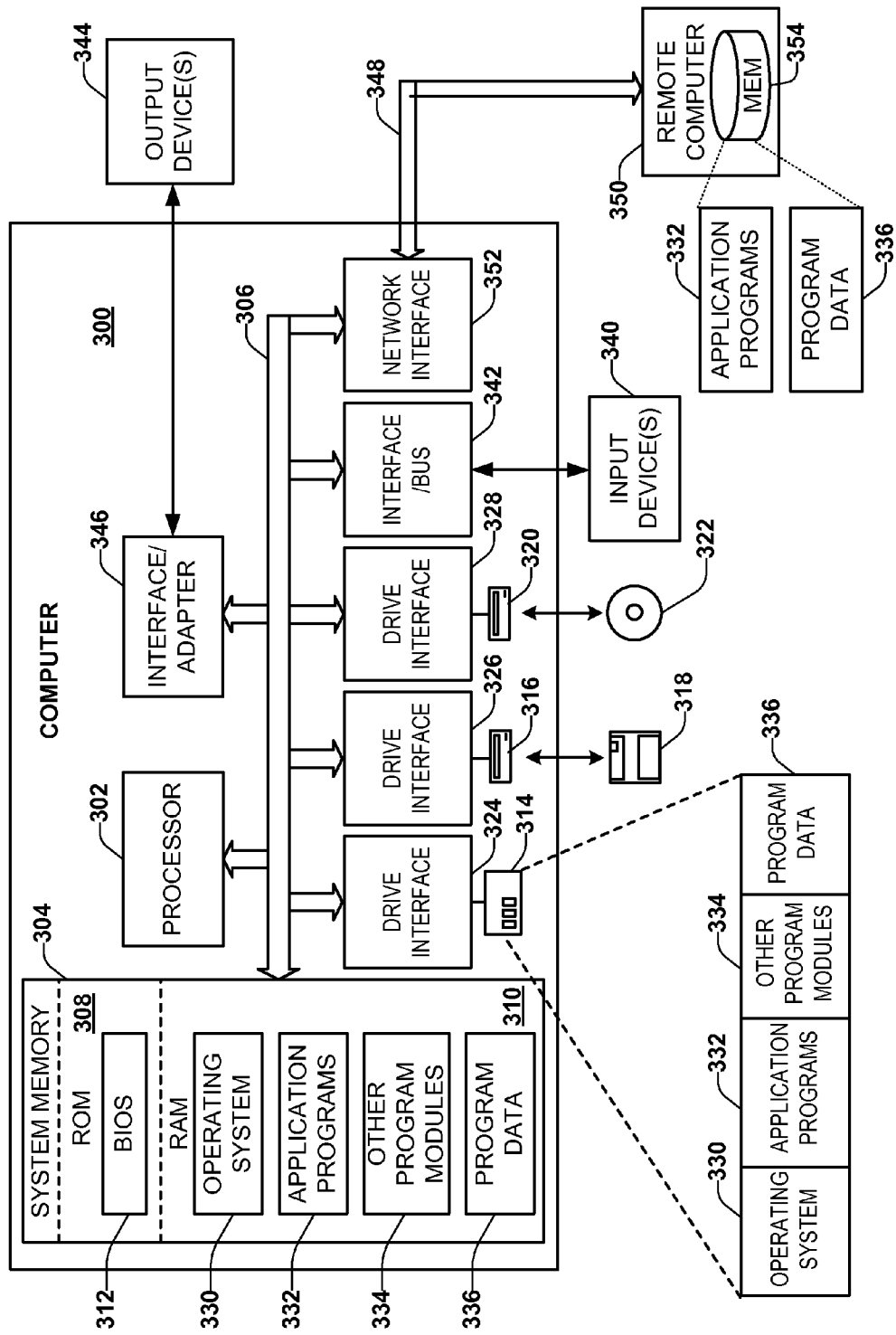
FIG. 4 illustrates a computer system that can be employed to implement systems and methods described herein, such as based on computer executable instructions running on the computer system.

FIG. 4 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for orienting an antenna in a communications system on a mobile platform to orient a peak of the antenna pattern in a direction associated with a signal source comprising:

receiving a signal from a signal source at the antenna;
measuring a signal strength from the received signal;
predicting a signal strength and a misalignment of the antenna along at least one axis according to a previous estimate of the signal strength, a previous estimate of the misalignment of the antenna, an estimated change in the signal strength, and a known change in the antenna orientation;

updating the predicted signal strength and misalignment of the antenna according to the measured signal strength to provide an estimate of a current misalignment of the antenna; and adjusting the orientation of the peak of the antenna pattern according to the estimated current misalignment of the antenna.

2. The method of claim 1, wherein updating the predicted signal strength and misalignment of the antenna further comprises updating the predicted signal strength and misalignment of the antenna according to data from an inertial measurement unit.

3. The method of claim 1, wherein updating the predicted signal strength and misalignment of the antenna further comprises updating the predicted signal strength and misalignment of the antenna according to data from an attitude reference sensor.

4. The method of claim 1, wherein updating the predicted signal strength and misalignment of the antenna further comprises updating the predicted signal strength and misalignment of the antenna according to data from a global positioning system.

5. The method of claim 1, wherein predicting a signal strength and a misalignment of the antenna along at least one axis comprises estimating the signal strength as a state in a Kalman filter.

6. The method of claim 1, further comprising determining a position of the signal source, orienting a peak of the antenna pattern toward the determined position, and scanning the antenna pattern peak across at least one axis until a signal is received.

7. The method of claim 1, wherein adjusting the orientation of the peak of the antenna pattern according to the estimated current misalignment comprises mechanically altering the orientation of the antenna.

8. The method of claim 1, wherein adjusting the orientation of the peak of the antenna pattern according to the estimated current misalignment comprises changing a power provided to at least one active element of the antenna.

9. A communications system configured to allow communications between a mobile platform and a signal source comprising:
an antenna assembly comprising an antenna;
a modem configured to determine a signal strength of a signal received at the antenna;
an attitude control assembly that is configured to employ a Kalman filter to estimate a misalignment of the antenna from a plurality of parameters comprising at least the determined signal strength, an orientation of the antenna at a previous time, an estimated signal strength at the previous time, and an estimated change in the signal strength; and
an orientation system configured to alter the orientation of the antenna according to the estimated current orientation at the Kalman filter.

10. The communications system of claim 9, the orientation system comprising a motorized platform that is configured to physically adjust the orientation of the antenna along at least one of an azimuth angle and an elevation angle.

11. The communications system of claim 9, further comprising an inertial measurement unit configured to determine a change in the position of the antenna assembly and provide the determined change in position to the attitude control assembly.

12. The communications system of claim 9, further comprising an attitude reference sensor configured to determine a change in the orientation of the antenna assembly and provide the determined change in orientation to the attitude control assembly.

13. The communications system of claim 9, further comprising a global positioning system configured to determine an absolute position of the mobile platform and provide the determined position to the attitude control assembly.

14. The communications system of claim 9, the mobile platform comprising an aircraft.

15. The communications system of claim 9, the mobile platform comprising a ground vehicle.

16. The communications system of claim 9, the signal source comprising a satellite relay.

17. A computer readable medium storing executable instructions configured to determine a misalignment of a peak response of an antenna from a signal source, the executable instructions comprising:
a modem interface configured to measure a signal strength from a signal received at the antenna;
a Kalman filter configured to predict a signal strength and a misalignment of the antenna along at least one axis as a state of the Kalman filter and update each of the predicted signal strength and misalignment of the antenna according to the measured signal strength to provide an estimate of a current misalignment of the antenna; and
an attitude control element configured to provided instructions to an antenna assembly as to adjust the orientation of the peak of the antenna pattern according to the estimated current misalignment of the antenna.

18. The computer readable medium of claim 17, further comprising a database indicting the position of the signal source for a plurality of times, the attitude control element utilizing the database for an initial orientation of the antenna.

19. The computer readable medium of claim 17, further comprising a sensor interface that receives data from at least one of an attitude reference sensor and an internal measurement unit and determines a position and orientation of the antenna in an antenna reference frame, the Kalman filter being configured update each of the predicted signal strength and misalignment of the antenna according to the measured signal strength and the determined position and orientation to provide an estimate of a current misalignment of the antenna.

20. The computer readable medium of claim 17, further comprising a vehicle systems interface that receives data from at least one system associated with the mobile platform and provides the data to the Kalman filter.

* * * * *